United States Patent
Gholap et al.

(10) Patent No.: US 8,068,988 B2
(45) Date of Patent: Nov. 29, 2011

(54) METHOD FOR AUTOMATED PROCESSING OF DIGITAL IMAGES OF TISSUE MICRO-ARRAYS (TMA)

(75) Inventors: Abhijeet S. Gholap, San Jose, CA (US); Gauri A. Gholap, San Jose, CA (US); Prithviraj Jadhav, Pune (IN); Sanford H. Barsky, Columbus, OH (US); Chiruvolu V. K. Rao, Pune (IN); Madhura Vipra, Pune (IN)

(73) Assignee: Ventana Medical Systems, Inc., Tucson, AZ (US)

( * ) Notice: Subject to any disclaimer, the term of this patent is extended or adjusted under 35 U.S.C. 154(b) by 931 days.

(21) Appl. No.: 11/132,931

(22) Filed: May 19, 2005

(65) Prior Publication Data
US 2006/0015262 A1    Jan. 19, 2006

Related U.S. Application Data

(63) Continuation-in-part of application No. 10/966,071, filed on Oct. 15, 2004, which is a continuation-in-part of application No. 10/938,314, filed on Sep. 10, 2004.

(60) Provisional application No. 60/573,262, filed on May 21, 2004, provisional application No. 60/501,142, filed on Sep. 10, 2003, provisional application No. 60/515,582, filed on Oct. 30, 2003, provisional application No. 60/530,714, filed on Dec. 18, 2003.

(51) Int. Cl.
*G01N 33/48* (2006.01)
*C12Q 1/68* (2006.01)
*A61B 5/04* (2006.01)

(52) U.S. Cl. ........... 702/19; 702/20; 600/544; 435/6

(58) Field of Classification Search ................ None
See application file for complete search history.

(56) References Cited

U.S. PATENT DOCUMENTS

2002/0177149 A1   11/2002  Rimm et al.
2003/0118222 A1    6/2003  Foran et al.
2004/0066960 A1*   4/2004  McLaren et al. ............. 382/128

FOREIGN PATENT DOCUMENTS
WO      WO 01/42796 A1   6/2001

OTHER PUBLICATIONS

Bhandarkar, et al. Automated analysis of DNA hybridization images for high-throughput genomics. Mach. Vision Appl.; Machine Vision and Applications. 2004; 15(3): 121-38.
Blekas, et al. An unsupervised artifact correction approach for the analysis of DNA microarray images. Proceedings 2003 International Conference on Image Processing. ICIP-2003. Barcelona, Spain, Sep. 14-17, Conference on Image Processing, New York, NY: IEEE, US. 2003; 165-8.
Brandle, et al. Robust DNA microarray image analysis. Mach. Vision Appl.; Machine Vision and Applications. 2003; 15(1): 11-28.
Jain, et al. Fully automatic quantification of microarray image data. Genome Research. 2002; 12(2): 325-32.
Steinfath, et al. Automated image analysis for array hybridization experiments. Bioinformatics. 2001; 17(7): 634-41.
Wan, et al. A rapid and efficient method for testing immunohistochemical reactivity of monoclonal antibodies against multiple tissue samples simultaneously. J. Immunol. Methods. 1987; 103(1): 121-9.
Kononen, et al. Tissue microarrays for high-throughput molecular profiling of tumor specimens. Nat. Med. 1998; 4(7): 844-7.

* cited by examiner

*Primary Examiner* — Shubo Zhou

(57) ABSTRACT

A method and system for automated quantitation of tissue micro-array image (TMA) digital analysis. The method and system automatically analyze a digital image of a TMA with plural TMA cores created using a needle to biopsy or other techniques to create standard histologic sections and placing the resulting needle cores into TMA. The automated analysis allows a medical conclusion such as a medical diagnosis or medical prognosis (e.g., for a human cancer) to be automatically determined. The method and system provides reliable automatic TMA core gridding and automated TMA core boundary detection including detection of overlapping or touching TMA cores on a grid.

10 Claims, 6 Drawing Sheets

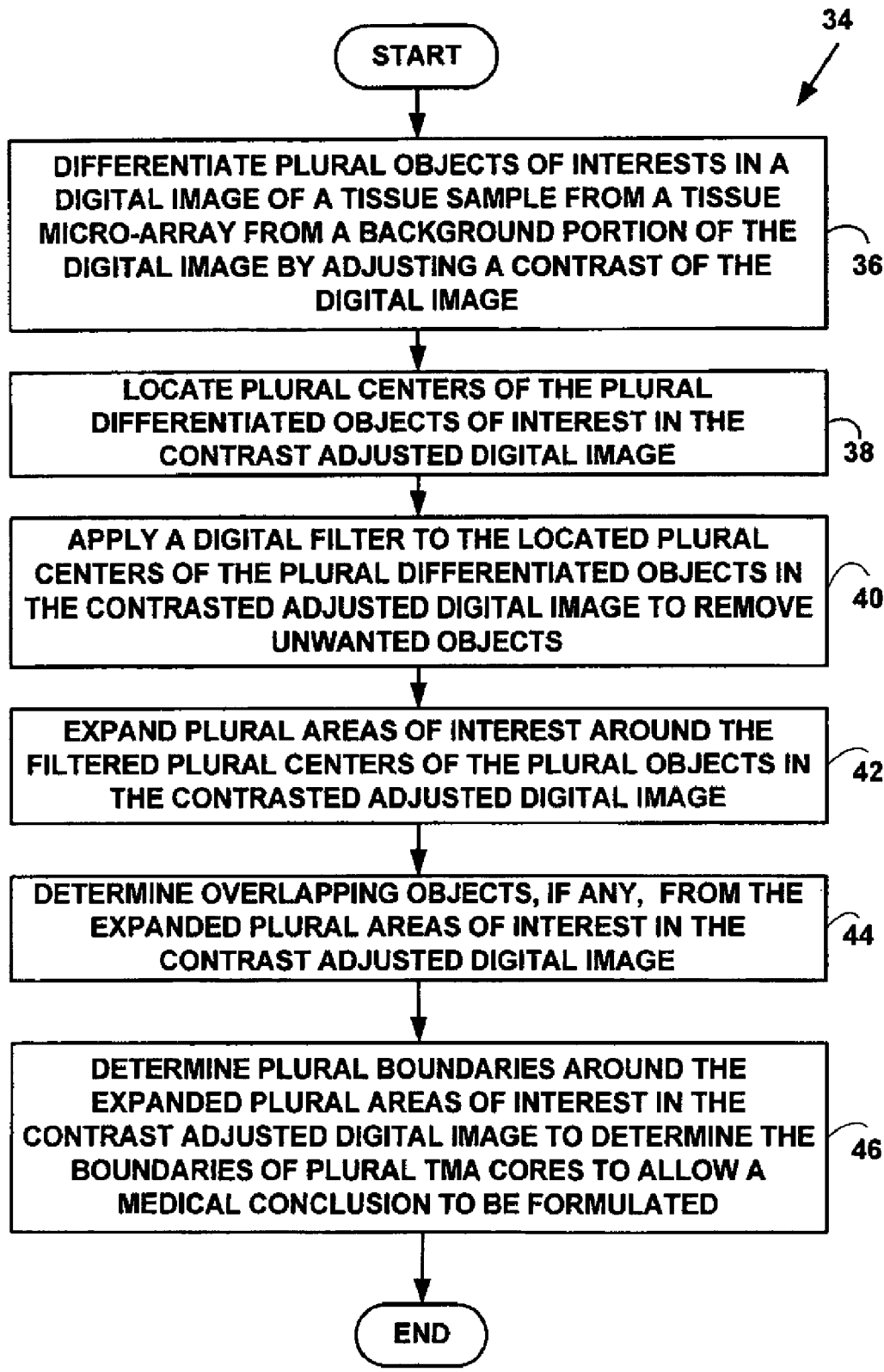

Copyright © 2004 by Bioimagene, Inc.

Copyright © 2004 by Bioimagene, Inc.

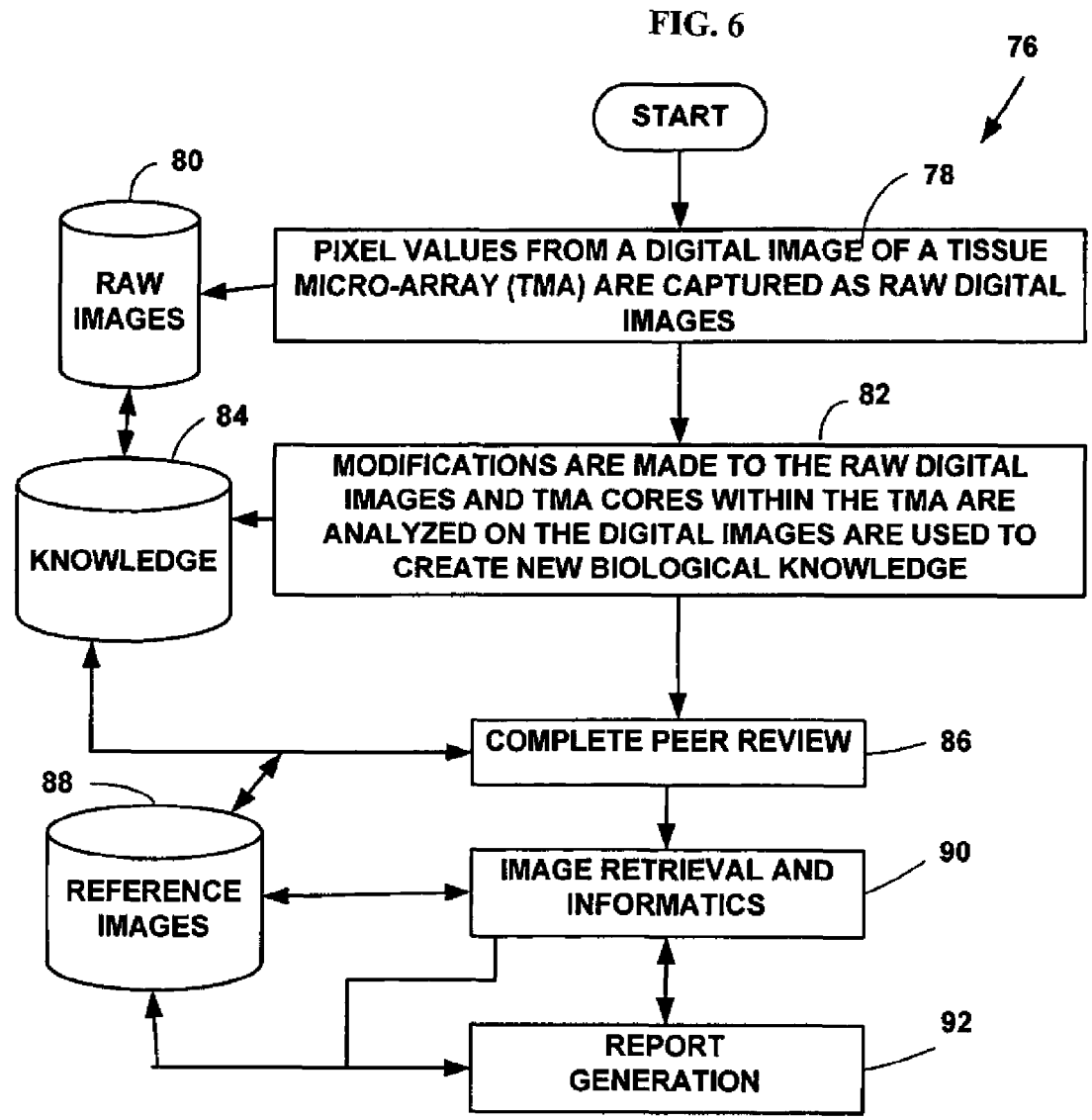

METHOD FOR AUTOMATED PROCESSING OF DIGITAL IMAGES OF TISSUE MICRO-ARRAYS (TMA)

CROSS REFERENCES TO RELATED APPLICATIONS

This application claims priority to U.S. Provisional Patent Application No. 60/573,262 filed May 21, 2004, the contents of which are incorporated by reference. This application is a continuation-in-part application of U.S. patent application Ser. No. 10/938,314, filed Sep. 10, 2004, which claims priority to U.S. Provisional Patent Application No. 60/501,142, filed Sep. 10, 2003, and U.S. Provisional Patent Application No. 60/515,582, filed Oct. 30, 2003. This application is also a continuation-in-part application of U.S. patent application Ser. No. 10/966,071, filed Oct. 15, 2004, which claims priority to U.S. Provisional Patent Application No. 60/530,714, filed Dec. 18, 2003, the contents of which are incorporated herein by reference in their entirety.

COPYRIGHT NOTICE

Pursuant to 37 C.F.R. 1.71(e), applicants note that a portion of this disclosure contains material that is subject to and for which is claimed copyright protection, such as, but not limited to, digital photographs, screen shots, user interfaces, or any other aspects of this submission for which copyright protection is or may be available in any jurisdiction. The copyright owner has no objection to the facsimile reproduction by anyone of the patent document or patent disclosure, as it appears in the U.S. Patent Office patent file or records. All other rights are reserved, and all other reproduction, distribution, creation of derivative works based on the contents of the application or any part thereof are prohibited by applicable copyright law.

FIELD OF THE INVENTION

This invention relates to digital image processing. More specifically, it relates to a method and system for automated quantitation of tissue micro-array (TMA) image analysis.

BACKGROUND OF THE INVENTION

Tissue micro-arrays are multiple specimen slides that contain hundreds of individual tissues for one or multiple different biological specimens. TMA allows staining (e.g., with Haematoxylin and Eosin (H/E) stain, etc.) and analysis of hundreds of samples on a slide over traditional one per slide. Tissues from multiple patients or blocks are relocated from conventional histologic paraffin blocks on the same slide. This is done by using a needle to biopsy a standard histologic sections and placing the core into an array on a recipient paraffin block. This technique was originally described by in 1987 by Wan, Fortuna and Furmanski in Journal of *Immunological Methods*. They prepared of "cores" of paraffin-embedded tissue from standard histology blocks. The paraffin embedded cores of the tissue were straightened, inserted into a casing and mounted in a paraffin block and sectioned. Over 120 tissue samples were analysed. Olli Kallioniemi and Juha Kononen in 1998 developed an ordered array of tissue cores, up to 1,000 of them, on a single glass slide termed tissue micro-array (TMA) and publishing it in the journal *Nature Medicine*, thereby validating the technique.

TMA technology allows rapid visualization of molecular targets in thousands of tissue specimens at a time, at the DNA, RNA, protein levels, etc. Moreover, this technique requires less tissue for analysis and offers consistency in reporting results. Additionally with serial sections of the master block, investigators can analyze numerous biomarkers over essentially identical samples. Configuration of TMA depends on the end use. There could be samples of every organ in a particular animal's or human's body, or a variety of common cancers like breast and colon carcinomas with normal controls, or rare or obscure cases, such as an array of salivary gland tumors. An array of tissues from different knockout mice or a single, specific tissue (e.g., from cultured cells) could also be assayed. These slides with TMAs are treated like other individual histological section, using in situ hybridization to detect gene expression or identify chromosomal abnormalities, or employing immunohistochemistry (IHC) to localize protein expression.

More broadly, researchers use TMAs to validate potential drug targets identified with DNA TMAs. Scientists typically construct TMAs in paraffin blocks. Each tissue core in the array is collected as a "punch" generally 0.6 millimeters (mm) to 2.0 mm in diameter, at a spacing of about 0.7 mm to 0.8 mm from a donor block of paraffin-embedded tissue, using a needle. The surface area of each sample is about 0.282 $mm^2$, or in pathologists' terms, about the size of 2-3 high power fields. A second, slightly smaller needle is used to create a hole in the recipient block. The tissue cores are then arrayed in the recipient block to produce a master block, from which researchers can obtain around 200 individual 5 micrometer ($\mu m$) slices.

Most of the applications of the TMA technology have come from the field of cancer research. Examples include analysis of the frequency of molecular alterations in large tumor materials, exploration of tumor progression, and identification of predictive or prognostic factors and validation of newly discovered genes as diagnostic and therapeutic targets. A standard histologic section is about 3-5 mm thick, with variation depending on the submitting pathologist or tech. After use for primary diagnosis, the sections can be cut 50-100 times depending on the care and skill of the sectioning technician. Thus, on average, each archived block might yield material for a maximum of 200 assays. If this same block is processed for optimal TMA construction it could routinely be needle biopsied 200-300 times or more depending on the size of the tumor in the original block (Theoretically it could be biopsied 1000's of times based on calculations of area, but empirically, 200-300 is selected as a conservative estimation).

Once TMAs are constructed, they can be judiciously sectioned in order to maximize the number of sections cut from an array. The sectioning process uses a tape-based sectioning aid that allows cutting of thinner sections. Optimal sectioning of arrays is obtained with about 2-3 $\mu m$ sections. Thus, instead of 50-100 conventional sections or samples for analysis from one tissue biopsy, TMA techniques produce material for 500,000 assays (assuming 250 biopsies per section times 2000 2.5 $\mu m$ sections per 5 mm array block) represented as 0.6 mm disks of tissue. TMA techniques essentially amplifies (up to 10,000 fold) from a limited tissue resource.

Another significant advantage is that only a very small (a few microliter ($\mu l$)) amount of reagent is required to analyze an entire TMA. This advantage raises the possibility of use of TMA in screening procedures (for example in hybridoma screening), a protocol that is impossible using conventional sections. TMAs also save money when reagents are costly. Finally, there are occasions where the original block of tissue must be returned to the patient or donating institution. In these cases the tissue block may be cored a few times without destroying the block. Then upon subsequent sectioning, it is still possible to make a diagnosis because tissue has been taken for TMA-based studies. Ultimately, this type of research helps clinicians make better diagnoses and better decisions about patient care.

Rapidly advancing technology has created exciting opportunities for researchers and physicians, who are trying to elucidate the causes of disease, create predictive or diagnostic assays and develop effective therapeutic treatments. Large-scale and high-throughput genomic and proteomic studies are generating vast amounts of data that are already leading to the identification of drug targets and disease biomarkers. The new challenge is to sift through all of the gene and protein expression data to find clinically relevant information. A rate-limiting step in the screening process has been the need to examine histological samples one at a time. This degree of scrutiny is necessary to interpret the often-complex expression and distribution patterns of target molecules within actual tissues. The reproducibility in TMA is achieved by large numbers essential for the statistically significant detection of biomarkers, protein and gene expression.

TMA applications include studies that attempt to link gene expression data with stages of tumor progression, screening and validation of drug targets, and quality control for molecular detection methods. Example applications of tissue micro-arrays in cancer research including analyzing the frequency of a molecular alteration in different tumor types, to evaluate prognostic markers, to test potential diagnostic markers and optimize antibody-staining conditions.

According to a recent survey, over 40% of researchers who currently use TMA are working on cancer research or diagnosis. Since tissue micro-arrays, per se, were developed by researchers at the National Cancer Institute, it is not surprising that early adopters of this technology are using them in oncology. Future market growth will be driven by adoption of tissue micro-arrays in other areas of research, such as neurobiology and infectious disease, as well as their increased utilization in high-throughput analysis of tissue sections, validation of DNA micro-array data and biomarker discovery.

Two recent studies highlight this point. Yale researchers recently published a study on HER2 expression in breast cancer tissue using TMAs, in which they found that higher levels of HER2 protein correlated with poorer clinical outcomes. The research used 300 archived tissue specimens, which were taken from patients diagnosed with invasive breast carcinoma from 1962 to 1977. But the scientists took just two 0.6-mm diameter cores from each sample, thereby preserving the archived tissues for future studies. In an earlier report, the same team studied the prognostic value of beta-catenin expression in 310 colon carcinoma specimens collected between 1971 and 1982.

The latter Yale study illustrates another benefit of TMA technology: quantitative analysis. Traditionally, pathologists use a four-point scale to rate specimens. Having a pathologist score each specimen is not only slow and laborious, but also yields results that are subjective, difficult to reproduce, and that don't reflect subtleties.

Therefore, the advantages of TMA analysis are speed, throughput, and standardization, ease-of-use, conservation of valuable tissue samples.

However, there are several problems associated with existing TMA technologies. The TMA techniques require complicated data collection and management has resulted in huge data which researchers are only now beginning to address. The usage of this technology has gained popularity and is being used more and more. TMA users must keep track of both clinical and experimental data. Each new biomarker studied in a given array increases the data's complexity. TMA is an informatics challenge. A software system for image archiving allowing a user to examine digital images of individual histological specimens, such as tissue cores from a TMA; evaluate and score them; and store all the data in a relational database is essential for TMA.

Tissue scoring is inherently subjective and imprecise. It is nonquantitative based on a manual score using a four-point scale: negative, weak positive, strong positive, or no data. It calls for an automated image analysis process that can localize and quantify the biomarkers in the given set of array. It can assist pathologist in more objective analysis. Quantitative measurements ultimately will allow predictions about patient outcomes and their response to therapy. But for most, the promise of TMAs remains unfulfilled, because scientists lack user friendly methods of high-speed automated quantitative.

About 90% of all human cancers are of epithelial origin. Diagnosis and prognosis of the epithelial tumors by pathologist involves microscopic analysis of the tissue. The expertise of the pathologist immediately allows him/her to identify an epithelial region in a given field against a stromal region to further characterize it. Thus identification and quantification of epithelial and stromal area of a given digital image of a tumor tissue is the first step in the analysis.

There is typically an interobserver and an intraobserver variability and lack of reproducibility in identifying specific morphological features manually by pathologists. This variability is partly due to the inherent difficulty of the specialty to varying levels of expertise among pathologists and to differences in subjective analysis and comprehension of pathological images.

Quantification of epithelial area with TMAs using an automated method offers practical advantages. Identification of the epithelium provides additional information for discrimination between the borderline and the malignant tumors. It can be done through measurement of the area percentage of the epithelium in tissue sections. Automated identification of epithelial area that can imitate basic processes of human visual image perception by computation of staining properties and generate results as per the requirement will assist pathologist in reducing the subjectivity in the field.

A number of companies have developed a variety of hardware and software solutions for TMA analysis. For example, Bacus Laboratories' BLISS system uses a tiling approach that scans a TMA piecemeal and then stitches together all the tiles to produce a single composite image.

Aperio Technologies' ScanScope digitizes an entire TMA array slide by applying linear detector technology used in fax machines. Trestle, with its MedScan product employs area scanning. Applied Imaging's Ariol imaging and analysis system can image both calorimetric and fluorescently labeled samples.

Beecher Instruments is producing a TMA analysis package based upon contextual information rather than pixel information. TissueAnalytics Array$^{f(x)}$, the software from Tissueinformatics Inc., gives information about the subcellular location of staining and can detect the presence of rare events, proteins expressed at low levels.

Mark Rubin, associate professor of pathology at Brigham & Women's Hospital, Harvard Medical School, helped develop a software system to deal with the image archiving problem while he was an associate professor at the University of Michigan. The software, called Profiler (portal.path.med.umich.edu), allows researchers to examine digital images of individual histological specimens, such as tissue cores from a TMA; evaluate and score them; and store all the data in a relational database.

Chih Long Liu, working with Mat van de Rijn developed a solution to some TMA bookkeeping headaches with two programs: TMA-Deconvoluter and Stainfinder (genome-www-.Stanford.edu/TMA/). TMA-Deconvoluter is a series of Excel macros that helps researchers get TMA data into a format that can be read by conventional data analysis tools like Cluster and TreeView (rana.lbl.Rov). Cluster runs a hierarchical cluster analysis on the TMA data, helping users to interpret the highly complex datasets obtained from TMAs stained with large numbers of antibodies, and TreeView allows researchers to browse the clustered data. Stainfinder is a Web interface that links the clustered TMA data to an online image database, allowing scientists to rapidly reevaluate the data and compare different stains on the same core.

It is observed that none of the methods in prior art provides a comprehensive solution to automated high speed TMA analysis addressing the issues of reliable automatic gridding and TMA core boundary detection. These issues and other issues need to be overcome, especially if solution needs to accommodate overlapping TMA cores.

Therefore it is desirable to provide a method and system for automated quantitation of tissue micro-array (TMA) digital image analysis.

SUMMARY OF THE INVENTION

In accordance with preferred embodiments of the present invention, some of the problems associated with automated TMA analysis systems are overcome. A method and system for system for automated quantitation of TMA digital image analysis is presented.

The method and system may improve automated analysis of digital images including biological samples such as tissue samples from digital images of a tissue micro-array (TMA) and aids automated diagnosis of diseases (e.g., cancer). The method and system provides reliable automatic TMA core gridding and automated TMA core boundary detection.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 3 is a flow diagram illustrating a method for locating objects of interest a digital image of a tissue sample from a tissue micro-array (TMA);

FIG. 6 is a block diagram illustrating an exemplary flow of data in the automated biological sample processing system.

DETAILED DESCRIPTION OF THE INVENTION

Exemplary Automated Biological Sample Analysis System

Figure 1:
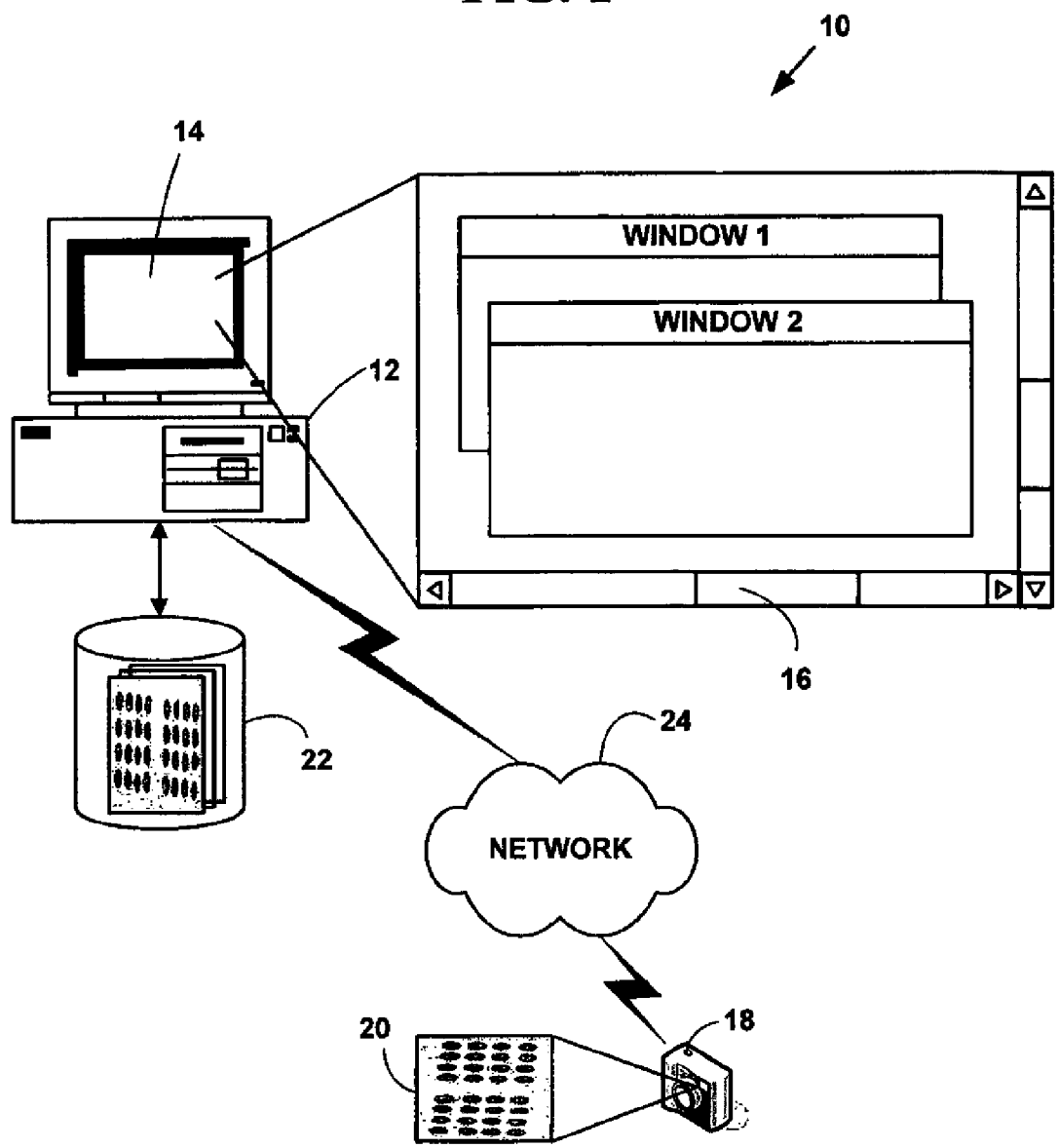
FIG. 1 is a block diagram illustrating an exemplary automated biological sample analysis processing system.

FIG. 1 is a block diagram illustrating an exemplary automated biological sample processing system 10. The exemplary system 10 includes one or more computers 12 with a computer display 14 (one of which is illustrated). The computer display 14 presents a windowed graphical user interface ("GUI") 16 with multiple windows to a user. The system 10 may optionally include a microscope or other magnifying device (not illustrated in FIG. 1). The system 10 further includes a digital camera 18 (or analog camera) used to provide plural digital images 20 in various digital images or digital data formats. One or more databases 22 (one or which is illustrated) include biological sample information in various digital images or digital data formats. The databases 22 may be integral to a memory system on the computer 12 or in secondary storage such as a hard disk, floppy disk, optical disk, or other non-volatile mass storage devices. The computer 12 and the databases 22 may also be connected to an accessible via one or more communications networks 24.

The one or more computers 12 may be replaced with client terminals in communications with one or more servers, or with personal digital/data assistants (PDA), laptop computers, mobile computers, Internet appliances, one or two-way pagers, mobile phones, or other similar desktop, mobile or hand-held electronic devices.

The communications network 24 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 24.

The communications network 24 may include one or more gateways, routers, or bridges. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

The communications network 24 may include one or more servers and one or more web-sites accessible by users to send and receive information useable by the one or more computers 12. The one ore more servers, may also include one or more associated databases for storing electronic information.

The communications network 24 includes, but is not limited to, data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is know in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 19 and the present invention is not limited to TCP/UDP/IP.

The one or more database 22 include plural digital images 20 of biological samples taken with a camera such as a digital camera and stored in a variety of digital image formats including, bit-mapped, joint pictures expert group (JPEG), graphics interchange format (GIF), etc. However, the present invention is not limited to these digital image formats and other digital image or digital data formats can also be used to practice the invention.

The digital images 20 are typically obtained by magnifying the biological samples with a microscope or other magnifying device and capturing a digital image of the magnified biological sample (e.g., groupings of plural magnified tissue samples, etc.).

An operating environment for the devices of the exemplary system 10 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals or biological signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

The term "sample" includes cellular material derived from a biological organism. Such samples include but are not limited to hair, skin samples, tissue samples, cultured cells, cultured cell media, and biological fluids. The term "tissue" refers to a mass of connected cells (e.g., central nervous system (CNS) tissue, neural tissue, or eye tissue) derived from a human or other animal and includes the connecting material and the liquid material in association with the cells. The term "biological fluid" refers to liquid material derived from a human or other animal. Such biological fluids include, but are not limited to, blood, plasma, serum, serum derivatives, bile, phlegm, saliva, sweat, amniotic fluid, and cerebrospinal fluid (CSF), such as lumbar or ventricular CSF. The term "sample" also includes media containing isolated cells.

One skilled in the art may determine the quantity of sample required to obtain a reaction by standard laboratory techniques. The optimal quantity of sample may be determined by serial dilution.

The term "biological component" include, but not limited to nucleus, cytoplasm, membrane, epithelium, nucleolus and stromal. The term "medical diagnosis" includes analysis and interpretation of the state of tissue material in a biological fluid. The interpretation includes classification of tissue sample as "benign tumor cell" or "malignant tumor cell". Interpretation also includes quantification of malignancy.

Digital Images

A digital image 20 typically includes an array, usually a rectangular matrix, of pixels. Each "pixel" is one picture element and is a digital quantity that is a value that represents some property of the image at a location in the array corresponding to a particular location in the image. Typically, in continuous tone black and white images the pixel values represent a gray scale value.

Pixel values for a digital image 20 typically conform to a specified range. For example, each array element may be one byte (i.e., eight bits). With one-byte pixels, pixel values range from zero to 255. In a gray scale image a 255 may represent absolute white and zero total black (or visa-versa).

Color images consist of three color planes, generally corresponding to Red, Green, and Blue (RGB). For a particular pixel, there is one value for each of these color planes, (i.e., a value representing the red component, a value representing the green component, and a value representing the blue component). By varying the intensity of these three components, all colors in the color spectrum typically may be created.

However, many images do not have pixel values that make effective use of the full dynamic range of pixel values available on an output device. For example, in the eight-bit or byte case, a particular image may in its digital form only contain pixel values ranging from 100 to 150 (i.e., the pixels fall somewhere in the middle of the gray scale). Similarly, an eight-bit color image may also have RGB values that fall within a range somewhere in middle of the range available for the output device. The result in either case is that the output is relatively dull in appearance.

The visual appearance of an image can often be improved by remapping the pixel values to take advantage of the full range of possible outputs. That procedure is called "contrast enhancement." While many two-dimensional images can be viewed with the naked eye for simple analysis, many other two-dimensional images must be carefully examined and analyzed. One of the most commonly examined/analyzed two-dimensional images is acquired using a digital camera connected to an optical microscope.

One type of commonly examined two-dimensional digital images 20 are digital images made from biological samples including cells, tissue samples, etc. Such digital images are commonly used to analyze biological samples including a determination of certain know medical conditions for humans and animals. For example, digital images are used to determine cell proliferate disorders such as cancers, etc. in humans and animals.

Tissue Micro-Arrays (TMA)

Digital images 20 captured through optical microscopes represent the images seen by a human eye through the microscope. As is known in the art, a tissue micro-array (TMA) is a piece of glass, plastic or other transparent material on which small pieces of biological materials such as tissue samples have been affixed in a microscopic array. The method and system described herein automatically analyze a digital image of a TMA created using a needle or other means to biopsy standard histologic sections and placing the resulting needle core or other core into a micro-array.

Automated Digital Image Analysis of TMAs

Figure 2:
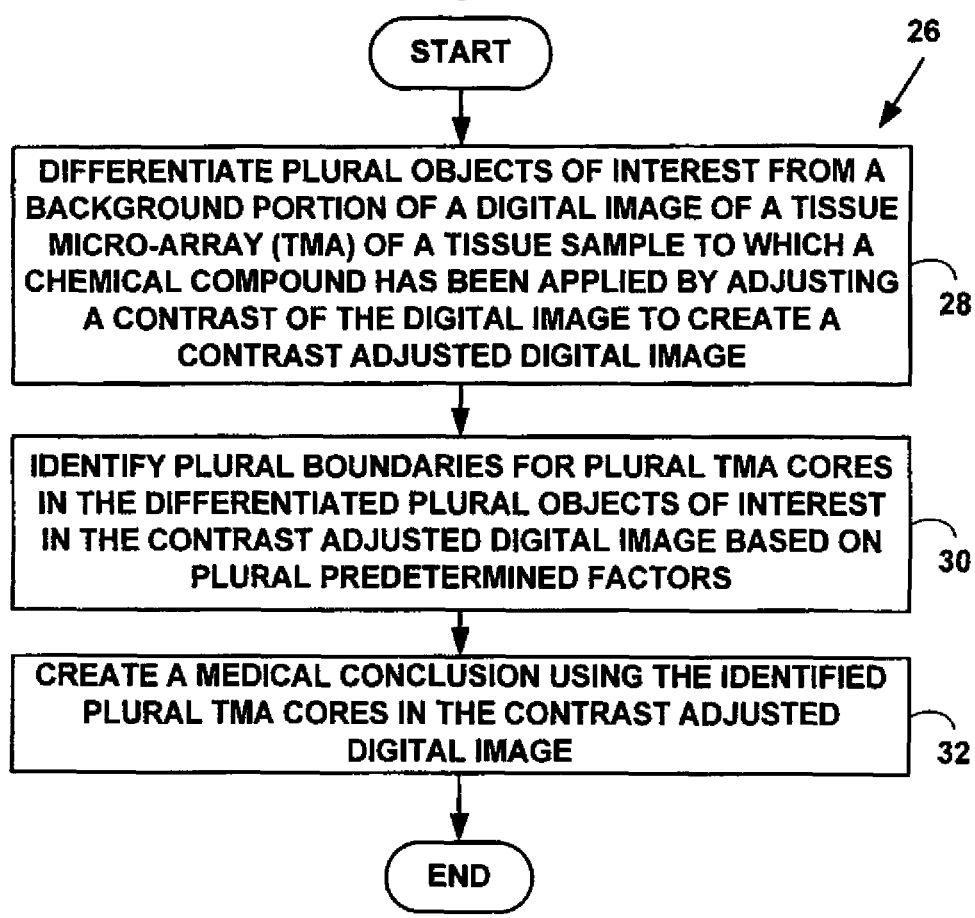
FIG. 2 is a flow diagram illustrating a method for locating objects of interest a digital image of a tissue sample from a tissue micro-array (TMA)

FIG. 2 is a flow diagram illustrating automated Method 26 for processing digital images of tissue micro-arrays (TMA). At Step 28, plural of objects of interest are differentiated from a background portion of a digital image of a tissue micro-array (TMA) of a tissue sample to which a chemical compound has been applied by adjusting a contrast of the digital image to create a contrast adjusted digital image. At Step 30, plural boundaries of plural individual TMA cores are identified in the differentiated plural objects of interest in the contrast adjusted digital image based on a plural predetermined factors. At Step 32, a medical conclusion is formulated using the identified plural TMA cores in the contrast adjusted digital image.

Method 26 is illustrated with one exemplary embodiment. However, the present invention is not limited to such an embodiment and other embodiments can also be used to practice the invention.

In such an exemplary embodiment at Step 28, plural of objects of interest including plural TMA cores are automatically differentiated from a background portion of a digital image of a TMA of a tissue sample to which a chemical compound has been applied by adjusting a contrast of the digital image to create a contrast adjusted digital image.

In one embodiment Step 28 includes making the plural potential TMA cores darker and the background portion lighter in the digital image by adjusting a contrast of the digital image to create a contrast adjusted digital image using determined maximum and minimum pixel values obtained from the digital image. Other pixel values within plural potential TMA cores and the background portion are mapped into a range including the maximum and minimum pixel values. However, the present invention is not limited to this embodiment and other embodiments can be used to practice the invention at Step 28.

In one embodiment, the chemical compound includes a Haematoxylin and Eosin (H/E) stain. However, the present invention is not limited to this embodiment and other chemical compounds can be used to practice the invention. In one embodiment, H/E staining is used so the red and blue color planes are used to determine stained pixel in potential TMA core and non-stained background portion pixels. If a biological tissue sample was treated with a chemical compound other than H/E stain, stained and non-stained pixels in the digital image 20 would appear as a different colors and thus other color planes would be used to practice the invention and determined stained and unstained pixels.

At Step 30, plural boundaries of plural TMA cores are automatically identified in the differentiated potential TMA cores of interest in the contrast adjusted digital image based on a plural predetermined factors. The predetermined factors include, but are not limited to, size, shape, length, width, core boundary characteristics, overlapping core areas, core grid position and pixel intensity of potential TMA cores.

At Step 32, a medical conclusion is automatically formulated using the identified plural TMA cores in the contrast adjusted digital image. The medical conclusion the medical conclusion includes a medical diagnosis or medical prognosis for a human cancer. The human cancer includes a human breast cancer, prostrate cancer or other human cancers. The medical diagnosis may also be made for animals.

In one embodiment, graphical lines are drawn around individual identified TMA cores to make them easier to identify. The displayed TMA cores are graphically displayed on a GUI on display 14.

FIG. 3 is a flow diagram illustrating automated Method 34 for processing digital images of tissue micro-arrays (TMA). At Step 36, plural objects of interests in a digital image of a tissue sample from a tissue micro-array (TMA) are differentiated from a background portion of the digital image by adjusting a contrast of the digital image to create a contrast adjusted digital image. At Step 38, plural centers of plural differentiated objects of interest are located in the contrast adjusted digital image. At Step 40, a digital filter is applied to the located plural centers of the plural objects of interest to remove unwanted objects. At Step 42, plural areas of interest are expanded around the filtered plural centers of the plural objects of interest. At Step 44, overlapping objects, if any, are determined from the plural expanded areas of interest. At Step 46, plural boundaries of the plural expanded areas of interest are determined for plural TMA cores to allow a medical conclusion to be formulated.

Method 34 is illustrated with one exemplary embodiment. However, the present invention is not limited to such an embodiment and other embodiments can also be used to practice the invention.

In such an exemplary embodiment, at Step 36, a contrast of a digital image is automatically adjusted. Plural pixels in the digital image 20 are adjusted such that an potential TMA core, which is darker than the background of the digital image 20 becomes even darker and the background portion which is usually light, because of transparency of the slide becomes even lighter.

Figure 4A:
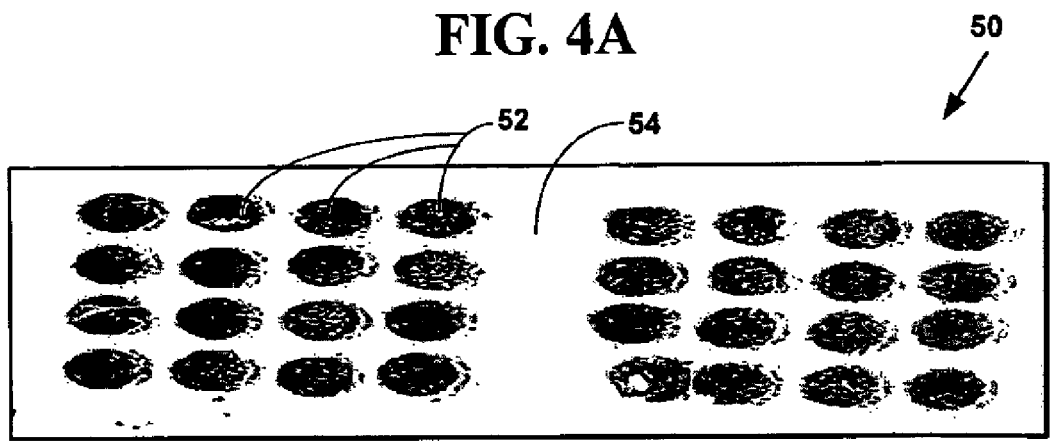
FIG. 4A is a block diagram illustrating an original digital image of a TMA.

FIG. 4A is a block diagram illustrating an original digital image 50 of a TMA. FIG. 4A illustrates plural exemplary TMA cores 52 and a background portion 54 in the original digital image 50.

Returning to FIG. 3, it is observed that there is large variation in the quality of the digital images 50. This variation is typically due to variation in staining, non-uniform illumination of a tissue sample, or non-linear quantization of capturing device. In one embodiment, digital image 50 adjustment is done through histogram modification. However, the present invention is not limited to such an embodiment and other digital image adjustment methods can be used to practice the invention.

Histogram modification helps ensure that the digital image 50 is insensitive to variations in staining intensity, image capturing device sensitivity, optical microscope lighting conditions. As a part of digital image 50 adjustment, contrast of the Red, Green and Blue (RGB) color planes of image are stretched based on image statistics, namely mean and standard deviation calculated based on pixel intensity values. In a contrast adjust digital image 56, pixel values are computed using the Equation (1).

Modified pixel intensity=Con1*(Pixel Value)/($P_{max}$−$P_{min}$), (1)

where Con1 is a first constant with a maximum value in the enhanced range or 255. However, the present invention is not limited to this constant value and or contrast adjusting equation other constant values and other contrast adjusting equations can also be used to practice the invention.

Color values at a given pixel are independently computed from Red, Green and Blue components of the digital image 50. A determination of an active range of original intensities in each of the colors is made by computing histograms of color planes (i.e., R, G and B) of the digital image 50. The histograms are used to compute a minimum intensity such that, starting from lowest intensity, cumulative pixels up to minimum intensity is equal to about 0.5% to 5% of a total number pixels in the digital image. An original active range is mapped to an enhanced range of intensity value (zero, 255). All pixels with value less than minimum intensity are also set to a value of zero. However, the present invention is not limited to this embodiment and other percentages and active ranges of intensities can also be used to practice the invention.

These histograms are used to compute a minimum intensity such that, starting from lowest intensity, the cumulative pixels up to minimum intensity is equal to pre-defined percentage "$P_{min}$," and a maximum intensity such that, starting from lowest intensity, the cumulative pixels up to maximum intensity is equal to a pre-defined percentage "$P_{max}$." Pixels in the active range, that is, in between minimum intensity and maximum intensity value are later mapped to an enhanced range (e.g., zero to 255). Equation (1) is used for modifying pixel intensities.

A pre-defined percentage of 2% is used for "$P_{min}$," for determining a minimum intensity in each color plane in the current embodiment. However, the present invention is not limited to such a pre-defined percentage and other pre-defined percentages can also be used to practice the invention.

A pre-defined percentage of 90% is used for "$P_{max}$," for determining a maximum intensity in each color plane in the current embodiment. However, the present invention is not limited to such a pre-defined percentage and other pre-defined percentages can also be used to practice the invention.

Figure 4B:
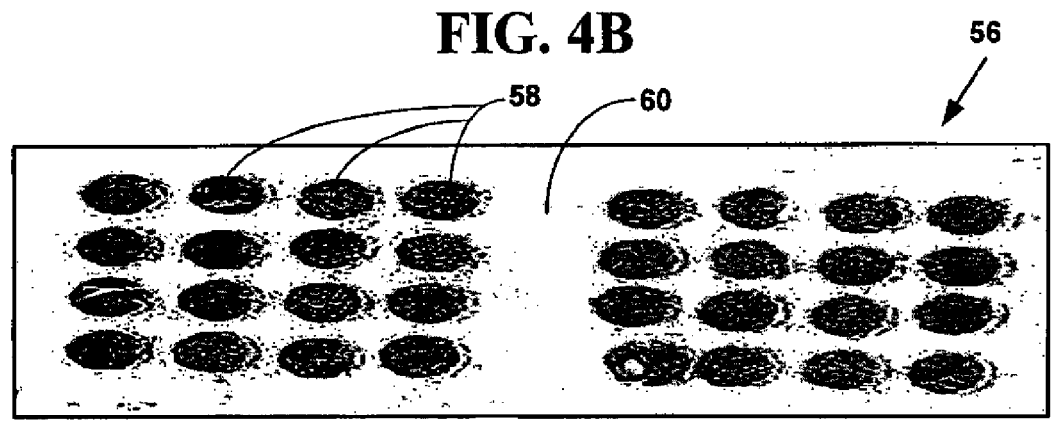
FIG. 4B is a block diagram illustrating a contrast adjusted digital image of the original digital image of FIG. 4A.

FIG. 4B is a block diagram illustrating a contrast adjusted digital image 56 of the original digital image 50 of FIG. 4A. FIG. 4B illustrates the plural TMA cores 58 are darker in color than the brighter background portion 60 of the contrast adjusted digital image after automated processing at Step 36.

Returning to FIG. 3 at Step 38, plural centers of plural differentiated objects of interest are located in the contrast adjusted digital image 56. In a given TMA, there could be several hundred cores, some of these cores are placed away from the center of an ideal grid used for analysis. In addition, cores at some of the grid positions for a TMA might be missing. In one embodiment, locating centers of cores present in a TMA is done using Gaussian kernel. However, the present invention is not limited to such an embodiment and other embodiments can also be used to practice the invention.

A Gaussian kernel is well known for weighted averaging of pixels in a small window centered around a given pixel. Keeping a window size equal to the width of two typical TMA cores sizes, a TMA core area 58 is differentiated from the background area. A Gaussian weighted average has a very high value in a background area 60.

Figure 5:
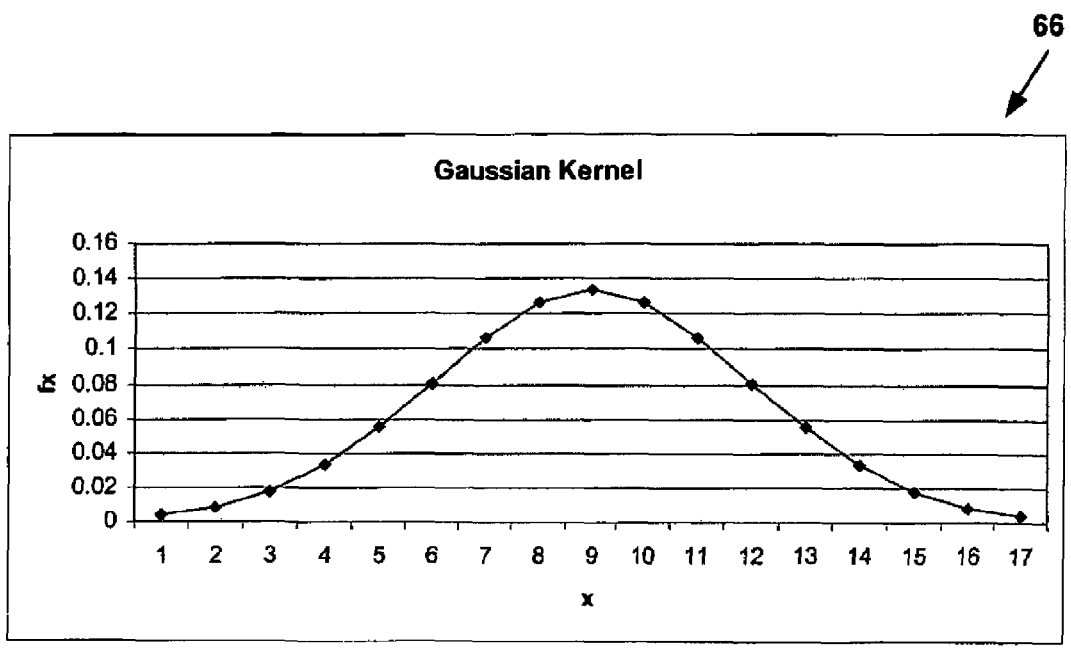
FIG. 5 is a block diagram illustrating a Gaussian kernel.

FIG. 5 is a block diagram illustrating a Gaussian kernel 66. In one embodiment of the invention, a Gaussian kernel of sigma three is used as is illustrated in Equation (2). However, the present invention is not limited to this embodiment another other Gaussian kernels and other equations to find a center of a TMA core can also be used to practice the invention.

$$\text{Gaussian kernel} f(x) = \text{power}(e - \text{constant}G * x * x / (\text{Sigma} * \text{Sigma})) / (\text{Sigma} * sqrt(\text{Con}C * pi)), \quad (2)$$

where e="2.71828 . . . ," constantG=0.5 and ConC=2. However, the present invention is not limited to these constant values and other values can be used to practice the invention. A Gaussian kernel is used for convolution with a modified image as is illustrated in Equation (3).

$$G = \sum_{x=-(kernelsize/2)}^{x=kernelsize/2} f(x) * Ix, \quad (3)$$

where "G" is a Gaussian value at a color position, "kernel size"=1+2*ceiling (2.5*Sigma) and "Ix" is a pixel value at x. Pixels that are on a curve of symmetry of epithelial cell or epithelial area are marked. Typically there will be two curves of symmetry, one parallel to X-axis and the other parallel to Y-axis. Pixels belonging to an area of interest are selected based on the intensity. Pixels with intensity value less than (i.e., Mean+Standard Deviation) of the image are selected as pixels belonging to an area of interest. However, the present invention is not limited to using the Gaussian kernel illustrated in Equation (3) and other equations can also be used to practice the invention.

A selected pixel is considered to be on the curve of symmetry (i.e., horizontal) only if the pixel's intensity value is less than five neighboring pixels intensity values in a upper direction and five neighboring pixel intensity values in a lower direction. Table 1 illustrates selection of pixel "F".

TABLE 1

| A |   |
|---|---|
| B |   |
| C |   |
| D |   |
| E |   |
|   | F |
| G |   |
| H |   |
| I |   |
| J |   |
| K |   |

In Table 1, the intensity value of Pixel F, should be less than or equal to the intensity values pixels A, B, C, D, E, G, H, I, J and K.

A selected pixel is considered to be on the curve of symmetry (i.e., vertical) only if a pixel intensity value is less than five neighboring pixels in first (e.g., left of) direction and five neighboring pixels intensity value in a second direction (e.g., right of). That is, in a row of eleven pixels, the intensity value of pixel F should be less than or equal to the intensity values pixels A, B, C, D, E, G, H, I, J and K as is illustrated in Table 2.

TABLE 2

| A | B | C | D | E |   | G | H | I | J | K |
|---|---|---|---|---|---|---|---|---|---|---|
|   |   |   |   |   | F |   |   |   |   |   |

TMA core areas 58 are identified as a set of X-connected pixels that satisfy above conditions. In one embodiment, X=8. However, the present invention is not limited to such an embodiment and other values can be used for X.

Figure 4C:
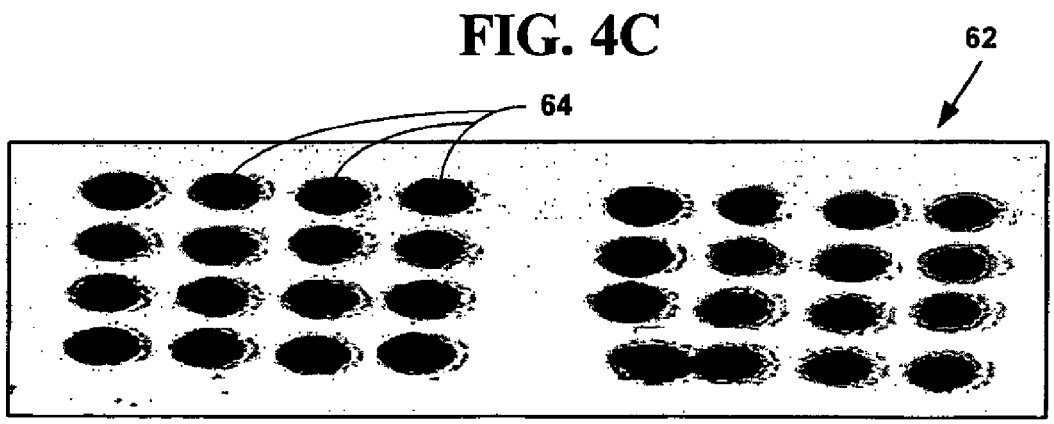
FIG. 4C is a block diagram 62 illustrating a plural centers located in the contrast adjusted digital image of FIG. 4B.

FIG. 4C is a block diagram 62 illustrating a plural centers 64 located in the contrast adjusted digital image 56 of FIG. 4B after the automatic execution of Step 40.

Returning to FIG. 3 at Step 40, a digital filter is applied to the located plural centers of the plural objects in the contrast adjusted digital image. It is observed that digital images of non-TMAs have artifacts, dust particles and other objects of non-tissue material. Removing such objects with a digital filter increases the accuracy of calculating a distance between adjacent grid points in the TMA.

In one embodiment a digital filter based on an expected size of a TMA core 58 is used. In such an embodiment a normal size of a TMA core is about 0.6 millimeter (mm) to 2.0 mm (i.e., "normal size") in diameter. However, the present invention is not limited to such an embodiment and other types of digital filters can also be used to practice the invention. TMA cores that are of very small size (e.g., less than about 0.6 mm) and/or a very large size (greater than about 2.0 mm) are filtered out from further consideration. Only cores of a "normal size" are used to avoid errors in later automated calculations of average TMA core width and height.

Returning to FIG. 3 at Step 42, plural areas of interest around the located plural centers of the plural objects are expanded. An extent of an area of interest of each TMA core 58 in a TMA is expanded to arrive at an accurate quantitation. Breaks in the tissue, tissue fragments, irregular shaped tissue samples or small islands of vacuoles in a tissue-material pose analysis problems that are overcome.

In one embodiment, an initial estimate of a TMA core boundary is arrived upon based on a threshold computed from contrast adjusted digital image statistics. However, the present invention is not limited to such an embodiment and other embodiments can also be used to practice the invention. A lateral-X and lateral-Y histograms around left right and top-bottom of each TMA core 64 is used to extend an area of interest. A lateral histogram in the X direction gives a measure of the number of pixels belonging to tissue in a column in the area of interest. If this count is very low (ideally it should be zero) and there is no difference between adjacent rows for three columns the current row is the edge of a TMA core 64. Similarly, a lateral histogram in Y direction gives a measure of a number of pixels belonging to tissue in a row in the area of interest. If this count is very low (ideally should be zero) and there is no difference between adjacent columns for three rows then the current column is an edge of the core.

Dilating a thresholded image followed by eroding the dilated image is used to remove noise (i.e., very small objects). Removal of small objects eliminates dust and artifacts. Treating these as potential TMA cores 64 leads to incorrect gridding, as these very small objects may be scattered on the slide. The dimensions of the detected TMA cores 64, including length and breadth are used to eliminate non-core tissue parts. If a tissue part is having height or width less than the minimum height or width of the normal TMA cores then it is deleted from the rest of the process. Average core size is computed.

Return to FIG. 3 at Step 44, overlapping objects, if any, from the located plural objects are determined. It is observed that many TMA cores 64 in a TMA are far from ideal grid positions. An extent (i.e., spread) of a TMA core 64 might be off from a center of a grid by a huge margin. This might lead to a situation where several cores 64 touch each other or significantly overlap. Therefore it is necessary to detect touching or overlapped area of interest for separating individual TMA cores 64 for accurate automated analysis of TMA cores 64. The four corners of the area of interest, which is a smallest rectangle around a TMA core 64 are used to check if these corners fall within another TMA core's area of interest or not.

After detecting overlapping core areas interest, if any, proper borders between the overlapped cores are determined. A determination is made if the overlap is in horizontal or vertical direction. Lateral histograms in the respective overlapping rectangular area are used for determining a point of boundary detection.

Returning to FIG. 3 at Step 46, boundaries for the expanded areas of interest are determined to delineate individual TMA cores 64 and allow a medical conclusion to be formulated. An average width, average height of a grid based on a distance between cores is computed. Separated cores are indexed and identified separating individual TMA cores 64. However, the present invention is not limited to such an embodiment and other embodiments can also be used to practice the invention.

In one embodiment, a first TMA core 64 is searched for from left to right and top to bottom. Once a first TMA core is detected, other TMA cores on a same row are detected by searching for other cores center within a range of a predetermined incremental distance (e.g., 5 to 8 pixels). The predetermined incremental distance is an average grid parameter. A check on the row and column size is done using the digital image dimensions. However, the present invention is not limited to this searching method and other methods can also be used to practice the invention, In one embodiment, graphical lines are drawn around individual TMA cores 74 to make them easy to identify. The displayed TMA cores 74 are graphically displayed on a GUI on display 14.

The boundaries for the determined TMA cores are used to determine a medical conclusion. The medical conclusion includes a medical diagnosis or medical prognosis for a human cancer. The human cancer includes a human breast cancer, prostrate cancer or other human cancer.

FIG. 6 is a block diagram illustrating an exemplary flow of data 76 in the automated biological sample processing system 10. Pixel values from a digital image of a TMA are captured 78 as raw digital images 80. The raw digital images are stored in raw image format in one or more image databases 22. TMA cores in the TMA are analyzed on the digital image and modifications made to the raw digital images 80 are used to create new biological knowledge 82 using the methods described herein. The new biological knowledge is stored in a knowledge database 84. Peer review of the digital image analysis and life science and biotechnology experiment results is completed 86. A reference digital image database 88 facilitates access of reference images from previous records of life science and biotechnology experiments at the time of peer review. Contents of the reference digital image database 88, information on the biological sample and analysis of current biological sample are available at an image retrieval and informatics module 90 that displays information on GUI 14. Conclusions of a medical diagnosis or prognosis or life science and biotechnology experiment are documented as one or more reports. Report generation 92 allows configurable fields and layout of the report. New medical knowledge is automatically created and stored in the knowledge database 84.

In one embodiment of the invention, the methods and systems described herein are completed within an Artificial Neural Networks (ANN). An ANN concept is well known in the prior art. Several text books including "Digital Image Processing" by Gonzalez R C, and Woods R E, Pearson Education, pages 712-732, 2003 deals with the application of ANN for classification of repeating patterns.

In one embodiment, an ANN based on FIG. 6 is used for training and classifying cells from automated TMA analysis over a pre-determined period of time. However, the present invention is not limited to such an embodiment and other embodiments can also be used to practice the invention. The invention can be practiced without use of an ANN.

The present invention is implemented in software. The invention may be also be implemented in firmware, hardware, or a combination thereof, including software. However, there is no special hardware or software required to use the proposed invention.

The method and system described herein provide at least: (1) two or more different levels of automated processing of TMAs, one for an entire TMA and the other at an individual TMA core level. This two level processing approach ensures that variations at a TMA global level as well as a local TMA level are compensated for; (2) use of image statistics to estimate distances between adjacent TMA cores and remove unwanted objects and artifacts and determine boundaries of TMA cores; and (3) methods to locate and refine an extent or boundary of each TMA core automatically including detection and handling of overlapping and spread out TMA cores.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A method for automated processing of digital images of tissue micro-arrays (TMA), comprising: differentiating a plurality of objects of interest from a background portion of a digital image of a tissue micro-array (TMA) of a tissue sample to which a chemical compound has been applied by adjusting a contrast of the digital image to create a contrast adjusted digital image; identifying a plurality of boundaries for a plurality of TMA cores in the differentiated plurality of objects of interest in the contrast adjusted digital image based on pixel intensity of potential TMA cores; displaying the contrast adjusted digital image with the plurality of TMA core boundaries graphically displayed on a graphical user interface; and creating a medical conclusion using the plurality of TMA cores having the identified boundaries in the contrast adjusted digital image;

wherein the identifying step includes: locating a plurality of centers of the plurality of differentiated objects of interest in the contrast adjusted digital image; applying a digital filter to the located plurality of centers of the plurality of differentiated objects in the contrasted adjusted digital image to remove unwanted objects; expanding a plurality of areas of interest around the filtered plurality of centers of the plurality objects in the contrasted adjusted digital image; determining overlapping objects, if any, from the expanded plurality of areas of interest in the contrast adjusted digital image; and determining a plurality of boundaries around the expanded plurality areas of interest in the contrast adjusted digital image to determine a plurality of boundaries of TMA cores; and wherein pixels with an intensity value less than a combined value of a mean intensity value and a standard deviation value of an area of interest are selected as pixels belonging to the area of interest.

2. The method of claim 1 further comprising providing a computer readable medium having stored therein instructions for causing one or more processors to execute the steps of the method.

3. The method of claim 1 wherein the differentiating step includes making the plurality objects of interest darker and the background portion lighter in the digital image.

4. The method of claim 1 wherein the chemical compound includes a Haematoxylin and Eosin (H/E) stain.

5. The method of claim 1 wherein the predetermined factors further include size, shape, length, width, core boundary characteristics, overlapping core areas, and core grid position.

6. The method of claim 1 wherein the locating step includes locating the plurality centers of the plurality of differentiated objects of interest using a Gaussian kernel.

7. The method of claim 6 wherein the Gaussian kernel includes a Gaussian kernel of sigma three.

8. The method of claim 1 wherein the applying step includes applying a digital filter based on a pre-determined range of sizes of a TMA core in the contrasted adjusted digital image.

9. The method of claim 8 wherein the pre-determined range of sizes is less than 0.6 millimeters and greater than 2.0 millimeters.

10. The method of claim 1 wherein the medical conclusion includes a medical diagnosis or medical prognosis for a human cancer including a human breast cancer or a human prostrate cancer.

* * * * *